United States Patent
McLaughlin et al.

(10) Patent No.: US 11,997,009 B2
(45) Date of Patent: May 28, 2024

(54) METHOD AND APPARATUS FOR AN ALTERNATE COMMUNICATION PATH FOR CONNECTED NETWORKS

(71) Applicant: Honeywell International Inc., Charlotte, NC (US)

(72) Inventors: Paul F. McLaughlin, Ambler, PA (US); Joseph Felix, Phoenixville, PA (US); James M. Schreder, Perkasie, PA (US); Robert Altimari, South Hampton, PA (US); John Rosa-Bian, Ambler, PA (US)

(73) Assignee: Honeywell International Inc., Charlotte, NC (US)

( * ) Notice: Subject to any disclaimer, the term of this patent is extended or adjusted under 35 U.S.C. 154(b) by 187 days.

(21) Appl. No.: 17/471,899

(22) Filed: Sep. 10, 2021

(65) Prior Publication Data
US 2023/0084697 A1    Mar. 16, 2023

(51) Int. Cl.
    *H04L 45/28* (2022.01)
(52) U.S. Cl.
    CPC ................. *H04L 45/28* (2013.01)
(58) Field of Classification Search
    CPC ............ H04L 45/28; H04L 12/4625
    See application file for complete search history.

(56) References Cited

U.S. PATENT DOCUMENTS

| 10,355,976 | B2 | 7/2019 | Sahlqvist | |
| 2009/0052317 | A1 | 2/2009 | Takagi et al. | |
| 2012/0294140 | A1 | 11/2012 | Cheung et al. | |
| 2018/0097919 | A1* | 4/2018 | Mueller | H04L 45/243 |
| 2019/0123933 | A1* | 4/2019 | Mueller | H04L 49/00 |
| 2021/0152495 | A1* | 5/2021 | Craig | H04L 67/125 |
| 2021/0223761 | A1 | 7/2021 | Flood | |
| 2023/0061491 | A1* | 3/2023 | Mullis | H04L 45/28 |

OTHER PUBLICATIONS

European Search Report for corresponding EP Application No. 22191832.9 dated Jan. 23, 2023.

* cited by examiner

*Primary Examiner* — Donald L Mills
(74) *Attorney, Agent, or Firm* — Paschall & Associates, LLC; James C. Paschall; Anthony Miologos

(57) ABSTRACT

A method is disclosed for using an alternate communication path to send and receive data between a first network node and a second network node. The method includes establishing a first communication path between the first network node and the second network node that sends and receives data between the first network node and second network node and a second communication path between the first network node and the second network node that sends and receives data between the first network node and second network node. A diagnostic program tests the first and second communication paths for network failures causing the alternate network path to send and receive data between the first network node and second network node when a network failure in the first and second communication paths is detected and alerting a technician of the failure and that the first and second communication paths need repair. The first and second communication paths returning to normal operation upon the repair of the failure.

20 Claims, 5 Drawing Sheets

METHOD AND APPARATUS FOR AN ALTERNATE COMMUNICATION PATH FOR CONNECTED NETWORKS

TECHNICAL FIELD

This disclosure relates generally to industrial process control and automation systems. More specifically, this disclosure relates to a method and apparatus for facilitating an alternate communication path for connected networks.

BACKGROUND

Industrial process control and automation systems are routinely used to automate large and complex industrial processes. These types of systems typically include sensors, actuators, controllers and other intelligent electronic devices for supervisory control and data acquisition. The intelligent electronic devices in such systems are interconnected and communicate through a LAN (local area network) or WAN (Wide Area Network). In such industrial process control and automation systems the architecture may include gateways that are connected to the I/O devices such as for example, sensors and actuators used in the automation system that are not directly connected to the controller. High availability applications operating within a LAN or WAN controlling and supervising the process control and automation system expect networks to have access to all intelligent electronic devices in the network in order to avoid communication disruption. Such as for example, parallel redundancy protocol (PRP) network systems and high-availability seamless redundancy (HSR) network systems.

Process controllers used in industrial process control and automation systems can have their I/O devices separated from the controller by a redundant Ethernet LAN network versus a traditional backplane. PRP network systems use two independent private networks to communicate control signals and data between the controller and I/O devices that may be connected to separate nodes of a network. PRP network systems duplicate the data frames to be transmitted, and add a unique sequence number to the end each of a standard communication data packet and sends both PRP frames through two independent LANs or WANs having a similar network topology. This communication method has an advantage versus a traditional non-PRP redundant network in that if a failure occurs on one LAN, the control to I/O connections can be recovered quickly using the redundant path. The recovery time to switch in the redundant path of a PRP, is for example in the microseconds, versus seconds for traditional non-PRP redundant networks.

A PRP network however could suffer from failure leading to a loss of control in the automation system if the LAN A cable associated with the controller experiences a fault such as for example a broken wire, a faulty connector or a failure in an Ethernet switch attached to the LAN A and the parallel LAN B associated with the I/O device node experiences a similar fault as explained above. In this scenario, there would be no PRP network path from the controller to the I/O devices, leading to a potential interruption of the control of the I/O device and loss of view to the I/O.

It would therefore be advantageous to provide an alternate network path around the failed LAN A and LAN B PRP networks that can route control and I/O traffic between the controller in a control node to its connected devices in an I/O node and continue normal operations until the faults can be diagnosed and repaired.

SUMMARY

This disclosure relates to a method and system for facilitating a parallel redundancy protocol in industrial process control and automation systems.

In a first embodiment an apparatus is disclosed for sending and receiving data on an alternate communication path between a first network node and a second network node. The apparatus includes a first network that connects the first network node to the second network node establishing a first communication path that sends and receives data between the first network node and the second network node. A second network that connects the first network node to the second network node establishing a second communication path that sends and receives data between the first network node and the second network node. A third network is connected to the first node and the second node that forms the alternate network path. The first network, the second network and the third network being disjoint from each other. A diagnostic program causes the alternate network path to send and receive data between the first network node and the second network node when a communication path failure in the first network and the second network is detected.

In a second embodiment, a method for using an alternate communication path to send and receive data between a first network node and a second network node is disclosed, the method includes establishing a first communication path between the first network node and the second network node that sends and receives data between the first network node and second network node. The method further includes establishing a second communication path between the first network node and the second network node that sends and receives data between the first network node and second network node and a third communication path between the first network node and the second network node the third communication path forming the alternate communication path. The first communication path, the second communication path, and the third communication path being disjoint from each other. The method includes testing the first communication path and the second communication path for network failures and causing the alternate communication path to send and receive data between the first network node and second network node when a network failure in the first communication path and the second communication path is detected.

In a third embodiment, a non-transitory computer readable medium containing instructions for sending and receiving data on an alternate communication path connected between a first network node and a second network node is disclosed that when the instructions are executed, cause at least one processing device to send and receive data between the first network node and the second network node using a first communication path between the first network node and the second network node and to send and receive data between the first network node and second network node using a second communication path between the first network node and the second network node. To test using a diagnostic program, the first communication path and the second communication path for network failures and to send and receive data between the first network node and second network node using the alternate communication path when a network failure in the first communication path and the second communication path is detected.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
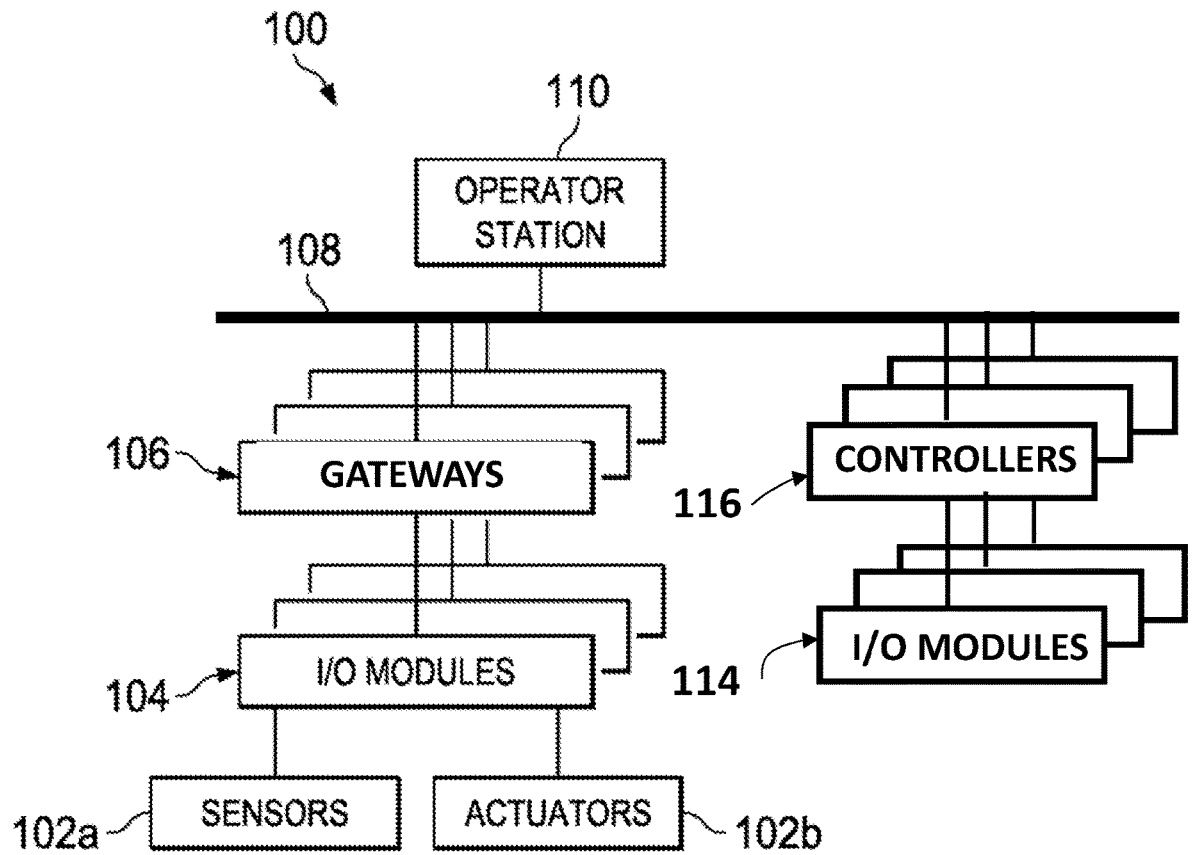
FIG. 1 illustrates an example industrial process control and automation system according to this disclosure.

FIG. 1 illustrates a portion of an example industrial process control and automation system 100 according to this disclosure. As shown in FIG. 1, the system 100 includes various components that facilitate production or processing of at least one product or other material. For instance, the system 100 can be used to facilitate control or monitoring of components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials or energy in different forms in some manner.

In the example shown in FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one input/output (I/O) module 104 is coupled to the sensors 102a and actuators 102b. The I/O modules 104 facilitate interaction with the sensors 102a, actuators 102b, or other field devices. For example, an I/O module 104 could be used to receive one or more analog inputs (AIs), digital inputs (DIs), digital input sequences of events (DISOEs), or pulse accumulator inputs (PIs) or to provide one or more analog outputs (AOs) or digital outputs (DOs). Each I/O module 104 includes any suitable structure(s) for receiving one or more input signals from or providing one or more output signals to one or more field devices. Depending on the implementation, the I/O module 104 could include fixed number(s) and type(s) of inputs or outputs or reconfigurable inputs or outputs. In the exemplary system of FIG. 1, I/O modules 104 are connected to gateways 106 via a network 108. The gateways 106 receive the supervisory control information from remotely located controllers 116. The gateways 106 serve as an entry and exit point for a network node. Control information as all data must pass through or communicate with the gateway prior to being routed from the node. For example, control information from controllers 116 can be sent to the actuators 102b from controllers 116 through one or more gateways 106. Data from the sensors 102a is communicated to one or more controllers 116 through one or more gateways 106.

For example, a first set of controllers 116 may use measurements from one or more sensors 102a to control the operation of one or more actuators 102b. These controllers 116 could interact with the sensors 102a, actuators 102b, and other field devices via the I/O module(s) 104. The controllers 116 may be coupled to the I/O module(s) 104 via Ethernet, backplane communications, serial communications, or the like. A second set of controllers 116 could be used to optimize the control logic or other operations performed by the first set of controllers. A third set of controllers 116 could be used to perform additional functions.

The controllers 116 can be used in the system 100 to perform various functions in order to control one or more industrial processes. For example, a first set of controllers 116, that operate as a first network node may use measurements from one or more sensors 102b sent from gateways 106 operating as a second and separated network node to control the operation of one or more actuators 102b. These controllers 116 could interact with the sensors 102a, actuators 102b, and other field devices via the gateways 106 and I/O module(s) 104. Additionally, controllers 116 can also communicate to sensors and actuators (not shown) that can be connected to I/O modules 114 in the first network node.

Controllers 116 are often arranged hierarchically in a system. For example, different controllers 116 could be used to control individual actuators, collections of actuators forming machines, collections of machines forming units, collections of units forming plants, and collections of plants forming an enterprise, either directly connected in their network node or to a different network node via a gateway 106. A particular example of a hierarchical arrangement of controllers 116 is defined as the "Purdue" model of process control. The controllers 116 in different hierarchical levels can communicate via one or more networks 108 and associated switches, firewalls, and other components.

Each controller 116 includes any suitable structure for controlling one or more aspects of an industrial process. At least some of the controllers 106 could, for example, represent proportional-integral-derivative (PID) controllers or multivariable controllers, such as Profit Controller or other types of controllers implementing model predictive control (MPC) or other advanced predictive control. As a particular example, each controller 116 could represent a computing device running a real-time operating system, a MICROSOFT WINDOWS operating system, or other operating system. Operator access to and interaction with the controllers 116 and other components of the system 100 can occur via various operator stations 110.

Each operator station 110 could be used to provide information to an operator and receive information from an operator. For example, each operator station 110 could provide information identifying a current state of an industrial process to an operator, such as values of various process variables and warnings, alarms, or other states associated with the industrial process. Each operator station 110 could also receive information affecting how the industrial process is controlled, such as by receiving setpoints for process variables controlled by the controllers 106 or other information that alters or affects how the controllers 106 control the industrial process. Each operator station 110 includes any suitable structure for displaying information to and interacting with an operator.

This represents a brief description of one type of industrial process control and automation system that may be used to manufacture or process one or more materials. Additional details regarding industrial process control and automation systems are well-known in the art and are not needed for an understanding of this disclosure. Also, industrial process control and automation systems are highly configurable and can be configured in any suitable manner according to particular needs.

Although FIG. 1 illustrates a portion of one example industrial process control and automation system 100, various changes may be made to FIG. 1. For example, various components in FIG. 1 could be combined, further subdivided, rearranged, or omitted and additional components could be added according to particular needs. Also, while FIG. 1 illustrates one example operational environment in which redundant controllers could be used, this functionality could be used in any other suitable system.

Figure 2:
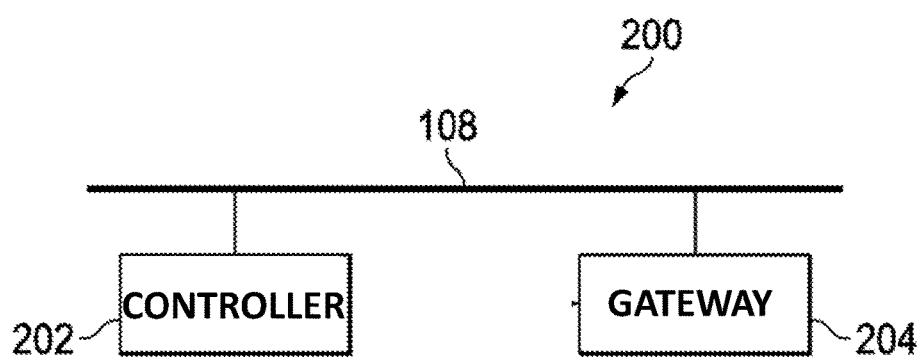
FIG. 2 illustrates an example control group consisting of a controller in a first network node communicating to a gateway in a second network node according to this disclosure.

FIG. 2 illustrates an example control group 200 consisting of a controller 202 in a first network node communicating to a gateway 204 in a second network node along one or more networks 108. For ease of explanation, the control group 200 is described as being used in the industrial process control and automation system 100 of FIG. 1. However, the control group 200 could be used in any other suitable system. The example, control group 200 operates at Level 1 of the Purdue model, and among other things, the example control group 200 may use the measurements from the one or more sensors 102a to control the operation of one or more actuators 102b.

As shown in FIG. 2, the control group 200 includes a controller 202 and a gateway 204. The controller 202 may represent, or be represented by, various ones of the controllers 116 of FIG. 1. The gateway 204 may represent, or be represented by, various ones of gateways 106 of FIG. 1. The controllers 202 and gateways 204 are connected to the one or more networks 108, such as FTE (Fault Tolerant Ethernet), IEC-61850, Ethernet/IP, or MODBUS/TCP networks. Controllers 202 could communicate with the sensors and implement control logic for controlling the actuators within their own network node. Controllers 202 could also communicate with gateways 106 and the sensors 102a and implement control logic for controlling the actuators 102b within the second network node of the gateway 204.

In an embodiment of the present disclosure, a private network facilitates communication between the controllers 202 and gateways 204. The private network can transport supervisory control and data between the controllers 202 and gateways 204, thereby allowing controllers 202 to access and control the sensors and actuators of the second network node.

The private network includes any suitable structure for transporting data between networked devices such as a parallel redundant protocol (PRP) network operating under IEC standard 62439-3. For example, each controller 202 could be configured as a node communicating between the gateways 204 using two independent PRP networks. Supervisory control and process data can be transmitted and received along the two independent networks between the controllers 202 and gateways 204. Each controller 202 includes any suitable structure configured to perform control operations in an industrial process control and automation system.

Although FIG. 2 illustrates an example of a controller group 200 having redundant process controllers for industrial control networks, various changes may be made to FIG. 2. For example, a controller group 200 could include more or fewer controllers. Also, any suitable number and configuration of other network devices could be used to interconnect the controllers in a controller group or a controller node.

Figure 3:
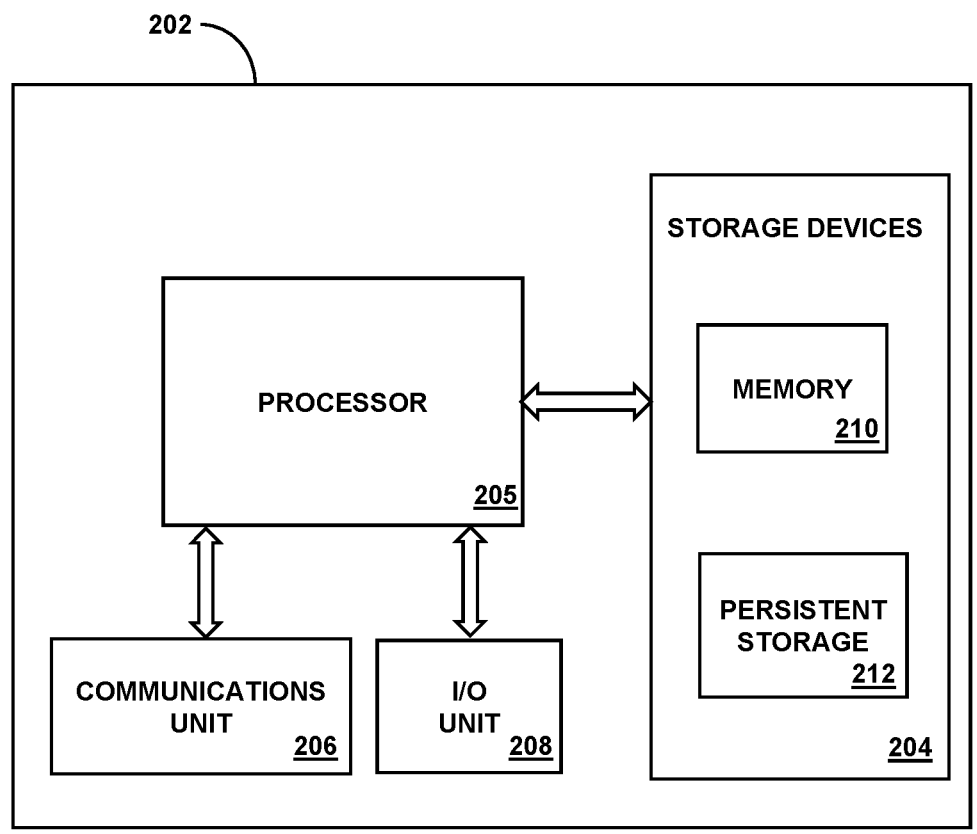
FIG. 3 illustrates an example controller of an industrial process control and automation system according to this disclosure.

FIG. 3 illustrates a schematic of an example of controller 202 of the controller node shown in FIG. 2. The controller 202 could, for example, represent any of the controllers 116 or other control system components used in a redundant configuration in FIG. 1. However, the controller 202 could represent any other suitable device supporting operation in a redundant manner, regardless of whether the device 202 is used for process control and automation.

As shown in FIG. 3, the controller 202 includes at least one processor 205, at least one storage device 204, at least one communications unit 206, and at least one I/O unit 208. Each processor 205 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include at least one network interface card or wireless transceiver facilitating communications over at least one wired or wireless network. As a particular example, the communications unit 206 could support communications with one or more sensors 102a or one or more actuators 102b over an I/O network 108. As another particular example, the communications unit 206 could support communications with higher-level components over the network 108. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the use of the I/O unit 208 for local I/O may not be needed, such as when the controller 202 is accessible locally or remotely over a network connection.

As described in more detail below, the processor 205 of the controller 205 can be used to execute a diagnostic system that test the operational functionality of the controller 202. The processor 205 of the controller 202 can also be used to execute an algorithm that supports the transfer of data from the controller 202 to a redundant device (such as to an associated redundant process controller 116).

Although FIG. 3 illustrates one example of a controller 202 for implementing the disclosure, various changes may be made to FIG. 3. For example, various components in FIG. 3 could be combined, further subdivided, or omitted and additional components could be added according to particular needs. Also, computing devices can come in a wide variety of configurations, and FIG. 2 does not limit this disclosure to any particular configuration of device.

Figure 4:
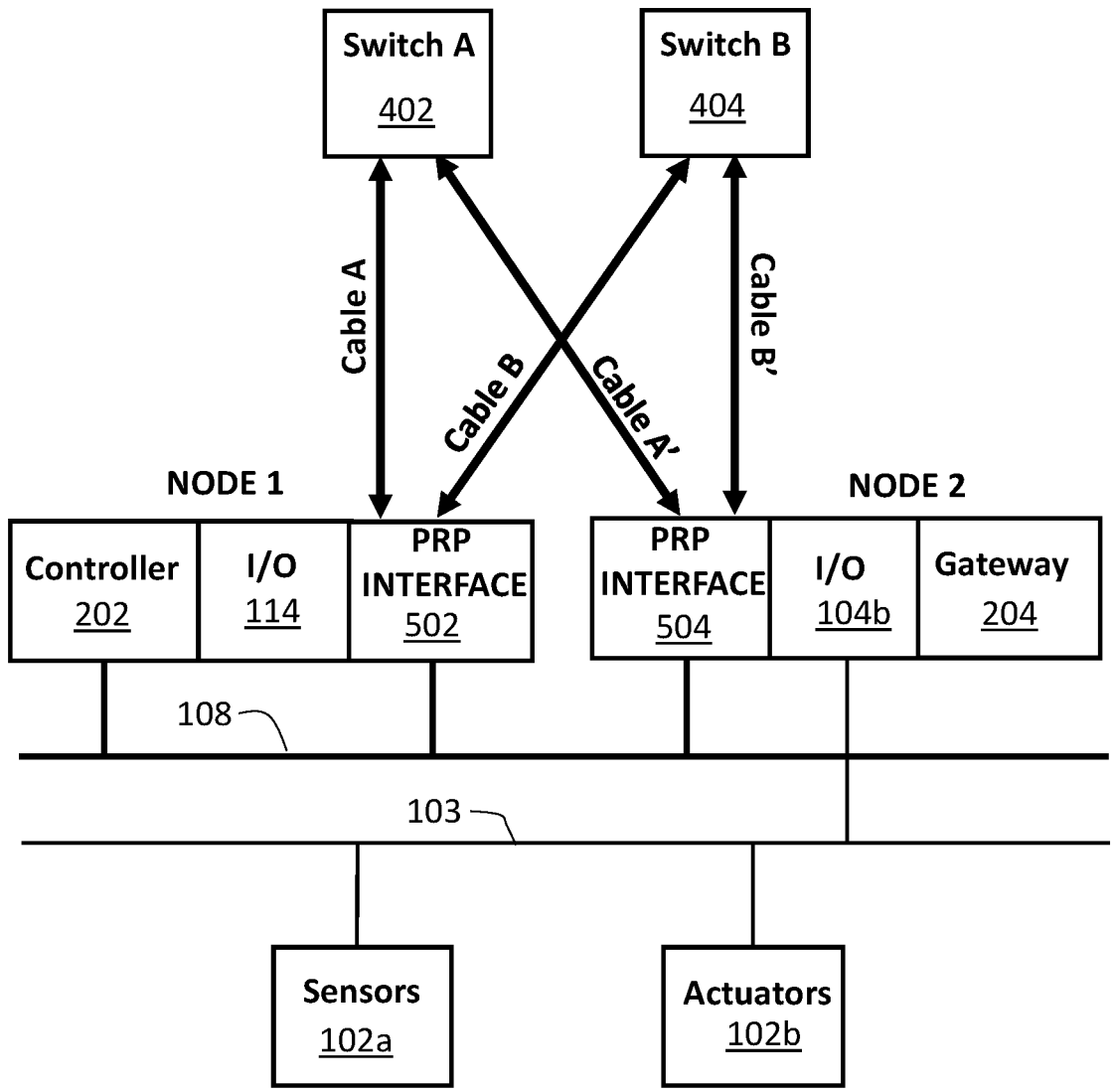
FIG. 4 illustrates an example schematic diagram of a PRP network for transporting supervisory control signals and data between a NODE 1 and a NODE 2 according to this disclosure.

FIG. 4 illustrates a private network for transporting data between controllers 202 and gateways 204 in accordance with an embodiment of present disclosure. A first network NODE 1 is formed by controller 202, local I/O module 114, and PRP interface module 502. A second network NODE 2 is formed by a gateway 204, I/O module 104b and interface module 504.

The controller 202 is connected to and communicates via one or more networks 108, such as network 108 shown in FIG. 1 and associated switches, firewalls, to other components of the industrial process control system 100 of FIG. 1. The sensors 102a and actuators 102b of this control group are connected to an I/O module 104b via one or more networks 103 and to an associated gateway 204 as was explained above in FIG. 1. The PRP network sends data from the controller 202 of NODE 1 to the gateway 204 and I/O module 104b of NODE 2 using two independent LAN networks connected between PRP interface modules 502, 504. For example, PRP interface module 502 associated with the network of NODE 1 communicates using a first network (hereinafter LAN A) comprised of a first cable A connected between module 502 and an Ethernet switch A 402 and a second cable A' connected from the Ethernet switch A 402 to interface module 504. Interface module 502 is further connected to a second network (hereinafter LAN B) via a first cable B to Ethernet switch B 404 and second cable B' connected to interface module 504. The PRP interface modules 502, 504 through their associated Ethernet switches 402, 404 establish two separate private networks, LAN A and LAN B between NODE 1 and NODE 2.

As was explained earlier, a PRP network such as the PRP network described above could suffer from failure leading to a loss of control in the automation system if the LAN A cables associated with NODE 1 experiences a fault, such as for example a broken wire, a faulty connector or have a failure in the Ethernet switch 402 and at the same time, the LAN B cables associated with the NODE 2 experiences similar faults as explained above. In this scenario, there would be no PRP network path from the controller 202 in NODE 1 to the I/O module 104b in NODE 2 and vice versa. In order to rectify such a loss in network communications between NODE 1 and NODE 2 each PRP interface 502 and 504 also includes a connection to the network 108 of the of the industrial process control and automation system.

As shown in FIG. 4, the PRP interface module 502 associated with NODE 1 includes a connection to network 108. Similarly, the PRP interface 504 associated with NODE 2 includes a similar connection to the network 108. This alternate communication path through network 108 can be used to send control signals and data packets between NODE 1 and NODE 2 when faults in LAN A and LAN B are detected that have cut-off or seriously degraded the PRP network. The alternate communication path can be used to transfer control and data between NODE 1 and NODE 2 until the PRP network is diagnosed and the faults in the PRP network repaired.

Figure 5:
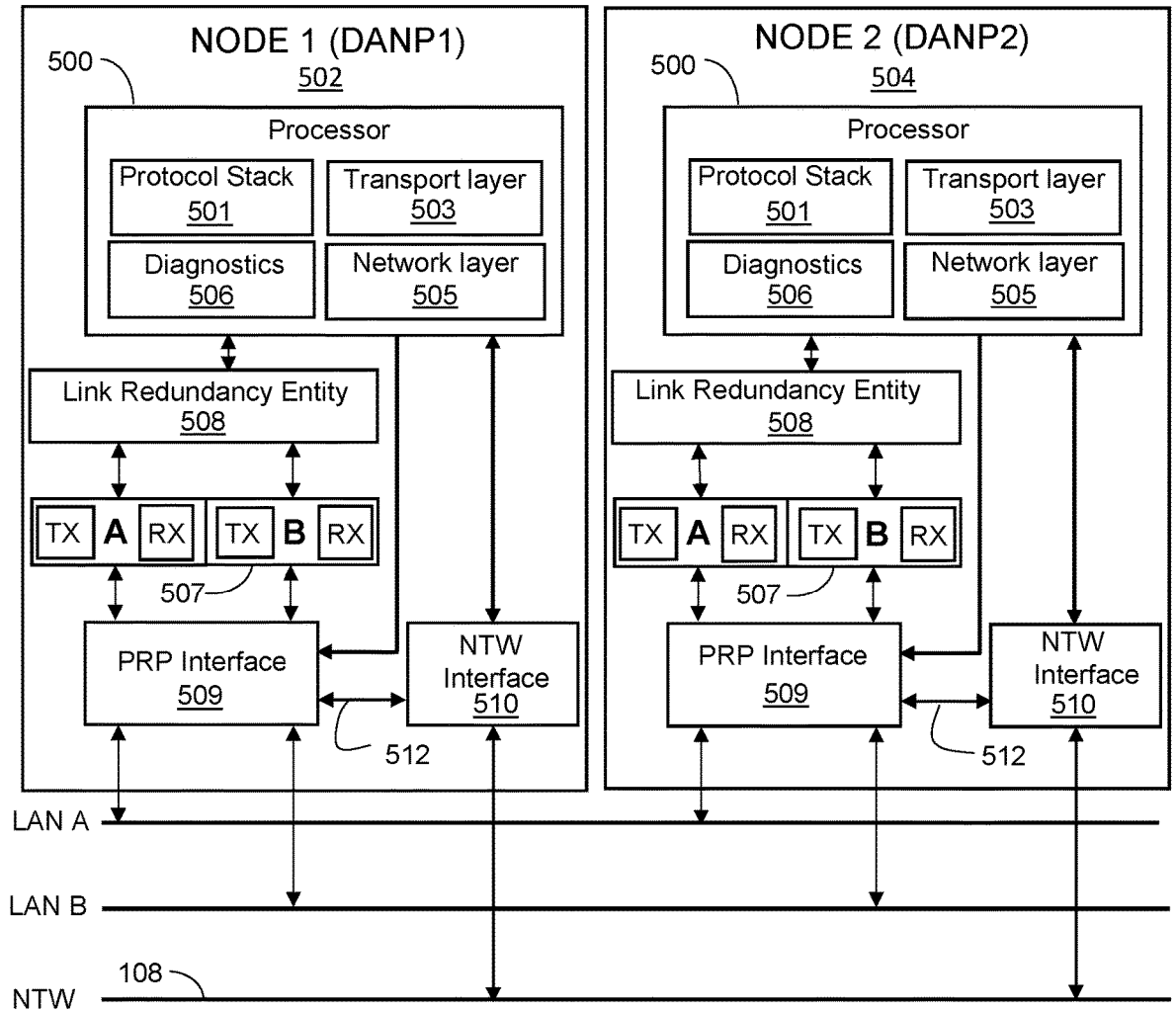
FIG. 5 illustrates example schematic diagram of the PRP interface modules implementing a PRP network according to this disclosure.

FIG. 5 illustrates an example of the PRP interfaces modules 502, 504 operating under IEC standard 62439-3. Each of the two PRP interface modules 502, 504 include a first doubly attached node (DANP1) 502 labeled in this disclosure as NODE 1. A second doubly attached node (DANP2) 504 is labeled as NODE 2. In this example, NODE 1 is associated with controller 202 and will be described as the source node and NODE 2 is associated with the gateway 204 and I/O module 104b and will be described as the destination node.

Each PRP interface module 502, 504 includes a processor 500, in the upper layers of the interface modules 502, 504 that includes one or more processors or other processing devices that can execute operating system instructions such as the protocol stack 501. The protocol stack 501 can be implemented in hypertext transfer protocol (HTTP) and may include a transmission control protocol (TCP) at a transport layer 503, and an IP Internet protocol (IP) at the network layer 505. These IEC protocol layer examples should be considered non-limiting and are merely illustrative of the types of communication protocols which can be implemented by the protocol stack and operated by the processor 500 of each PRP interface module 502, 504. A diagnostic layer 506 is also included in the upper layers of the interface modules 502, 504. The diagnostic layer 506 checks for faults in the cabling, connections, switches, and other physical devices comprising LAN A and LAN B.

Each PRP interface module 502, 504 further includes TX/RX circuitry 507 which implement the PRP-related functions described herein, as they pertain to the communication stack of the link redundancy entity (LRE) 508 of IEC standard 62439-3. As described in IEC 62439-3, to achieve redundancy, PRP-compatible nodes are connected to two independent network LANs having similar topology, (e.g., a first independent network comprised of LAN A and a second independent network comprised of LAN B) through two independent physical ports (port A and port B). The physical ports include circuitry such as transmit (TX) circuitry and receive (RX) circuitry 507 for dealing with the physical connectivity of the corresponding NODE 1 and NODE 2 connections.

Each pair of ports A and B for the same node share the same MAC address and operate in parallel to each other. Each pair of ports A and B are attached to the protocol stack 501 of the upper layers of its respective PRP interface module through the LRE 508. The LRE 508 ensures that the upper layers are unaware of and unaffected by the redundancy. The LRE 508 performs two key tasks related to the PRP-related functions described herein, the LRE 508 handles the duplication of PRP frames and manages acceptance of the received packets from LAN A and LAN B.

For example, the upper layers of the protocol stack 501 are tasked to attach a MAC header to the data packet and convert the data packet it to an IEEE 802.3 frame, as is done in non-redundant networks. The MAC header includes a source MAC address field, a destination MAC address field, and other fields such as a tag and an Ethernet type/size field for an Ethernet frame. Normally the LRE 508 uses the same destination MAC address for the destination within a network. The LRE 508 duplicates the data frame received from the upper layers and appends a redundancy check trailer (RCT) to each duplicated data frame. The LRE 508 then transfers the data packet frames to the transmitter of port A associated with LAN A and the transmitter of port B associated with LAN B. In the present embodiment the packets from the port A and port B are sent to PRP Interface 509 for transmission to the destination NODE 2 using both LAN A and LAN B.

The two PRP frames travel through LAN A and LAN B with different delays and, ideally, both reach the destination node 2 and are processed through the PRP interface 509 and the port A and port B RX circuitry and the LRE 508 of the PRP interface module 504. The LRE 508 of NODE 2 processes the PRP frame that arrives first and discards the second one (if it arrives). The MAC address of the source, NODE 1 in this example, is used to identify the received PRP frame.

The PRP source and destination nodes just explained use the NODE 1 PRP interface module 502 associated with controller 202 as the source node and the NODE 2 PRP interface module 504 associated with the gateway 204 and I/O module 104b as the destination node. The PRP network of the present invention can also operate to provide data to the controller 202 from NODE 2. For example, process data from the I/O module 104b provided by sensor 102a and other devices connected to I/O module 104b thereby, operating NODE 2 act as the source node and NODE 1 as the destination node. For example, the two duplicated PRP frames from the LRE 508 of NODE 2, are applied to the port A and port B TX circuitry 507 and to PRP interface 509 to travel through LAN A and LAN B and be received by the port A and port B respectively, of RX circuitry 507 of NODE 1 to be processed by LRE 508 of NODE 1 as explained above.

Each PRP interface module 502, 504 includes a diagnostics layer 506 in the upper layers of each interface module that routinely performs network integrity checks of LAN A and LAN B when operating. The diagnostics can independently initiate a cutover to send and receive the PRP frames along network (NTW) 108 when a failure of LAN A and LAN B is detected. It should be noted that the NTW 108 can be one or more separate FTE (Fault Tolerant Ethernet), IEC-61850, Ethernet/IP, or MODBUS/TCP networks or the same network 108 shown in FIGS. 1 and 2. The processor 500 executing the diagnostics layer 506 would periodically interrogate the LAN A and LAN B integrity to detect if a failure has occurred. For example, the processor 500 of the NODE 1 PRP interface module 502 would periodically send a "heart beat" message packet along LAN A to the processor 500 of the NODE 2 diagnostics layer 506. Similarly, the processor 500 of the NODE 2 PRP interface module 504 would periodically send a "heart beat" message packet along LAN B to the processor 500 of the NODE 1 diagnostics layer 506. In another example, the diagnostics layer 506 of each node could transmit a frame error rate signals on a respective LAN A or LAN B to detect any failures in the LAN A and LAN B networks. Other diagnostic methods knovn in the industry for testing Ethernet networks for diagnosing communication path integrity could be used to detect failures in LAN A and LAN B.

Upon detection of a failure in bath LANs A and B the diagnostics layer 506 can command a cutover that uses NTW 108 to transfer data packets between NODE 1 and NODE 2. For example, in FIG. 5, diagnostics layer 506 of NODE 1, upon the detection of a failure in LAN A, would send a diagnostic message to the NODE 1 NTW interface 510 that is transmitted on NTW 108. The diagnostic message is addressed to the network interface 510 and diagnostics layer 506 of NODE 2 informing NODE 2 of the failure of the LAN A. If the NODE 2 LAN Bis operating normally, no action is taken to cutover the LAN A network to use the alternate communication path of the NTW 108 network. The diagnostics layer 506 of NODE 1 502 would however also send a fault message to controller 202 via the NTW interface 510 and NTW 108, notifying the controller 202 of the failure of LAN A.

Similarly, diagnostics layer 506 of NODE 2, upon the detection of a failure in LAN B, would send a diagnostic message via the NUN interface 510 and NTW 108 of the NODE 2 to the interface 510 and diagnostics layer 506 of NODE 1 informing NODE 1 of the failure of the LAN B. If LAN A is operating normally no action is taken to cutover the LAN B network to use NTW 108 as an alternate communication path. The diagnostics layer 506 of NODE 2 would however also send a faith message to controller 202 via network interface 510 and the NTW 108 network.

However, if both diagnostics layers 506 report a fault or failure of each LAN A and LAN B than a cutover procedure is instituted in each node to use the NTW 108 as an alternate conummication path to send PRP control and data between NODE 1 and NODE 2, With renewed reference to FIG. 5, upon the detection of a failure of the LAN A and LAN B networks each processor 500 of each PRP interface module 502, 504 would send a signal to its respective PRP interface 509 to cut over and use the alternate network route to send and receive PRP frames between NODES 1 and NODES 2. For example, PRP interface module 502 acting as the source would have the diagnostics layer 506 instruct the PRP interface 509 to stop sending and receiving network traffic through the PRP interface 509 and establish a direct communication path along connection 512 to NTW interface 510 and begin sending and receiving network traffic from the NTW interface 510 of NODE 1. Similarly, the PRP interface module 504 acting as the destination would have the diagnostics layer 506 instruct the PRP interface 509 to begin sending and receiving network traffic from the NTW interface 510 of NODE 2.

The NTW interface 510 of NODE 1 would transmit the PRP frames received from TX A circuitry 507, through NTW interface 510 and NTW 108 to the NTW interface 510 of NODE 2. The NTW interface 510 would transmit the received. PRP frames to the NODE 2 interface 509 from the NTW interface 510 via connection 512 and the RX A circuitry 507 to be processed by LRE 508, PRP frames from NODE 2 when acting as the source would be sent similarly along NTW 108 from the NODE 2 NTW interface 510 to PRP interface 509 RX A circuitry 507 to be processed by the LRE 508 of NODE 1.

For the ease of explanation the present disclosure has been explained as the alternate network path only one NTW 108 path. However, most modern Ethernet networks used in plants operate using a fault tolerant system includes a second redundant network NTW 108 path to carry duplicate traffic (not shown). The present disclosure can be used to simultaneously carry duplicate PRP frames from a node acting as the source to the node acting as the destination using the port B channel TX/RX (circuitry 507 along the second redundant network of NTW 108 path, in the same manner as explained above for the port A channel.

The diagnostics layers 506 of each PRP interface modules 502, 504 would continue to test each LAN A and B for recovery of the PRP network. The diagnostics layer 506, as explained earlier, would continue to send fault messages to the controller 202 of the status of each LAN A and LAN B via NTW 108.

Figure 6:
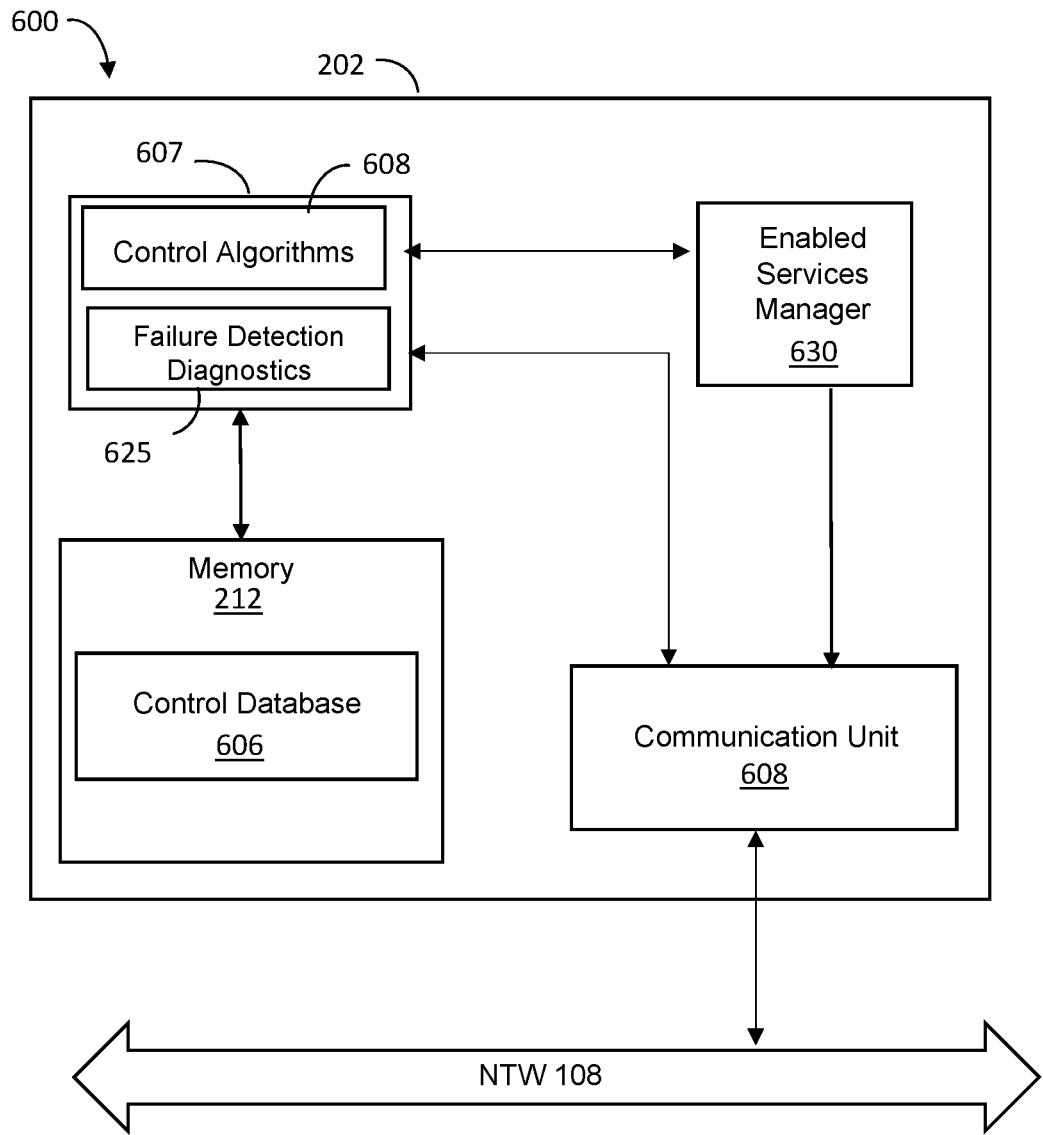
FIG. 6 illustrates an example architecture for providing service analytics and reporting faults of the PRP network according to this disclosure.

FIG. 6 illustrates an example architecture for providing service analytics and reporting faults of the PRP network according to the present disclosure. For ease of explanation, the architecture 600 may be described as being implemented within the controller 202 of FIG. 5. The controller 202 is implemented using the device 200 of FIG. 3. However, the architecture 600 shown in FIG. 6 can be used with any suitable device and in any suitable system.

In this example, the architecture 600 includes a processor 607 that executes one or more control algorithms 608, stored in a control database 606 representing memory locations in main writable memory of a persistent storage 212, or other storage device 204. Each control algorithm 608 can be used to control one or more aspects of at least one industrial process. One operation of at least one of the control algorithms 308 is to track and send data to I/O modules 104 and sensors 102a and actuators 102b and other devices, associated with the controller 202. NTW 108 represents an Ethernet network, such as for example network 108 shown in FIG. 1. The NTW 108 connects to controller 202 through the communication unit 608, that can be represented by the communication unit 208 of controller 202 described in FIG. 3.

The processor 607 also includes and executes a failure detection diagnostic algorithm 625. Processor 607 and the failure detection diagnostics 625 would receive the fault messages transmitted from interface modules 502 and 504 along NTW 108. The processor 607 is further connected to an enabled services manager 630. Fault messages and any diagnostic data received with the fault messages are processed by the failure detection diagnostics 625 and sent to and reviewed by the enabled services manager 630. The enabled services manager 630 would log the fault discovered in the PRP network as a diagnostic event and prioritize the detected faults based on a critical status.

Prioritizing the detected faults can include organizing the collected faults so that the most important (e.g., urgent) faults can be addressed the earliest. For example, a failure detected on only LAN A or only on LAN B would still allow the message traffic to be sent between NODE 1 and NODE 2. This would be registered as a non-urgent low priority fault. However, a complete failure of both LAN A and LAN B would be prioritized as urgent or a high priority failure. The fault messages sent by NODE 1 and NODE 2 may also include diagnostic data that can include abnormal parameters. The diagnostic data that contain abnormal parameters that are severely outside (e.g., exceedingly under or over) the threshold limitation value, can be listed first to establish an order. The detected faults reported to be present can also be validated so as to ensure their existence. Validating the diagnostic data of a detected fault can include comparing the collected diagnostic data to past data, the parameter settings, and functionality of the PRP network connections.

Minor events would be logged-in to an event journal and to on-line diagnostic summary and reported, by the enabled services manager 630 by sending a diagnostic message along NTW 108 using communication unit 608 to alert a user. Alerting the user can include alerting (e.g., notifying) the user via dashboard, mobile, user interface, or a report. For example, the alert messages can be provided (e.g., displayed and/or presented) to a remote operator (e.g., expert, user technician) at an associated operator station 110 connected to network 108. Once alerted, a technician would repair the fault in the PRP network. However, embodiments of the present disclosure are not so limited. For example, diagnostic messages can be provided to any person and/or entity responsible for diagnosing, fixing, and/or resolving abnormalities associated with the automation system, and/or any person and/or entity responsible for diagnosing and/or improving field automation system operations.

In some embodiments, the diagnostic messages reported by the enabled services manager 630 can include parameters (e.g., field parameters) and diagnostic data associated with the control system 100 associated with the PRP network connecting NODE 1 and NODE 2. The field parameters can include information associated with the control system 100, such as system configurations. The collected diagnostic data can include information relating to the set of parameters. For urgent faults, such as for example, the detection that no PRP network exists between NODE 1 and NODE 2 the enabled services manager 630 would send diagnostic messages to an operator station 110 that the alternate network path between NODE 1 and NODE 2 has been activated and that the immediate repair of the PRP network must be conducted.

When the PRP network is repaired, each PRP interface module 502, 504 generates and sends a message to the diagnostics layer 506 of each PRP interface module 502, 504 that the LAN A and LAN B has returned to normal operation. The processor 500 instructs PRP interface 509 to return to normal operation, routing message traffic through PRP interface 509 and LAN A and LAN B. A normal operation message is also sent to controller 202, notifying the controller 202 that normal operation of the LAN A and LAN B has resumed. Manager 630 then generates and logs an event to indicate the PRP network between NODE 1 and NODE 2 has returned to normal and sends a message to the user of the normal condition of the PRP network.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for sending and receiving data on an alternate communication path between a first network node and a second network node; the apparatus comprising:
    a first network connecting the first network node to the second network node, the first network establishing a first communication path that sends and receives data between the first network node and second network node;
    a second network connecting the second network node to the first network node, the second network establishing a second communication path that sends and receives data between the first network node and second network node;
    a third network connected to the first network node and the second network node the third network forming the alternate network path, the first network, the second network and the third network being disjoint from each other, wherein the alternate network path is a physical network; and
    a diagnostic program that causes the alternate network path to send and receive data between the first network node and the second network node when a communication path failure in the first network and the second network is detected.

2. The apparatus of claim 1, wherein:
    the communication path of the first network connects the first network node to the second network node through a first network switch; and
    the communication path of the second network connects the second network node to the first network node through a second network switch.

3. The apparatus of claim 2, wherein the first network node includes a first doubly attached node (DANP1) interface module and the second network node includes a second doubly attached (DANP2) interface module each of the DANP1 and DANP2 interface modules including:
    a processor executing operating system instructions including the diagnostic program;
    a parallel redundancy protocol (PRP) interface connecting the first network and the second network to a respective independent physical port that establishes the first and the second communication paths between the DANP1 and DANP2 interface modules; and
    a third interface connected to the third network and the alternate communication path.

4. The apparatus of claim 3, wherein the diagnostic program of each of the DANP1 and DANP2 interface modules tests the communication path of the first network and the communication path of the second network for failures in the first and second communication paths.

5. The apparatus of claim 3, wherein the first network and the second network are a private redundant network comprised of two independent communication paths operating under IAC standard 62439-3.

6. The apparatus of claim 1, wherein the third network is one or more separate fault tolerant Ethernet (FTE), IEC-61850, Ethernet/IP, or MODBUS/TCP data communication networks.

7. The apparatus of claim 4, wherein the diagnostic program of each of the DANP1 and DANP2 interface modules sends diagnostic messages to the processor of each of the DANP1 and DANP2 interface modules along the third network advising each DANP1 and DANP2 processor of the operational status of the first and second communication paths of the first and second networks.

8. The apparatus of claim 7, wherein the processor halts the transmission and reception of data through the PRP interface of each of the DANP1 and DANP2 interface modules after reception by each DANP1 and DANP2 interface modules of a diagnostic message of the failure of the first and second communication paths and instructs the third interface of each of the DANP1 and DANP2 interface modules to send and receive data through the third interface and the alternate communication path.

9. The apparatus of claim 8, wherein the third network is connected to a controller, the controller executing failure detection diagnostics algorithm that receives the diagnostic status messages sent by the DANP1 and DANP2 interface modules and forwards alert messages to an operator station that the alternate network path has been activated and that a repair of the first and second network is required.

10. A method for using an alternate communication path to send and receive data between a first network node and a second network node; the method comprising:
    establishing a first communication path between the first network node and the second network node that sends and receives data between the first network node and second network node;
    establishing a second communication path between the first network node and the second network node that sends and receives data between the first network node and second network node;
    establishing a third communication path between the first network node and the second network node the third communication path forming the alternate communication path, the first communication path, the second communication path, and the third communication path being disjoint from each other, wherein the alternate communication path is a physical network; and testing the first communication path and the second communication path for network failures, causing the alternate communication path to send and receive data between the first network node and second network node when a network failure in the first communication path and the second communication path is detected.

11. The method of claim 10, comprising:
providing a first doubly attached node (DANP1) interface module connected to the first network node and a second doubly attached (DANP2) interface module connected to the second network node;
executing operating system instructions by a processor including a diagnostic program by each of the DANP1 and DANP2 interface modules;
connecting the first communication path and the second communication path to respective independent physical ports of a parallel redundancy protocol (PRP) interface for sending and receiving data between the DANP1 interface module of the first network node and the DANP2 interface module of the second network node;
providing a third interface at each of the DANP1 and DANP2 interface modules, the third interface connected to the alternate communication path, each of the DANP1 and DANP2 interface modules arranged to send and receiving data through the third interface and the alternate communication path when the first communication path and the second communication path have failed.

12. The method of claim 11, wherein the method includes:
testing by the diagnostic program of the DANP1 interface module of the operational status of the first communication path;
testing by the diagnostic program of the DANP2 interface module of the operational status of the second communication path; and
sending diagnostic messages of the operational status of the first and second communication paths between the DANP1 and DANP2 interface modules using the alternate communication path.

13. The method of claim 12, wherein the method further incudes:
instructing by the processor to halt the transmission and reception of data through the PRP interface of each the DANP1 and DANP2 interface modules after reception by each of the DANP1 and DANP2 interface modules of a diagnostic message of the failure of the first and second communication paths; and
instructing by the processor the third interface of each of the DANP1 and DANP2 interface modules to send and receive data through the third interface and the alternate communication path.

14. The method claim 13, wherein the alternate communication path is connected to a controller, the controller executing a failure detection diagnostic algorithm, the method including:
receiving by the controller the diagnostic messages sent by the DANP1 and DANP2 interface modules; and
causing the failure detection diagnostic to send an alert message to an operator station that the alternate communication path between the DANP1 and DANP2 interface has been activated and that a repair of the first and second communication path is required.

15. The method of claim 14, wherein the method further incudes:
instructing by the processor to halt the transmission and reception of data through the third interface and resume transmission and reception of data through the PRP interface of each of the DANP1 and DANP2 interface modules after reception by each of the DANP1 and DANP2 interface modules of a diagnostic message that the first and second communication paths are operating normally.

16. A non-transitory computer readable medium containing instructions for sending and receiving data on an alternate communication path connected between a first network node and a second network node that when the instructions are executed, cause at least one processing device to:
send and receive data between the first network node and the second network node using a first communication path between the first network node and the second network node;
send and receive data between the second network node and first network node using a second communication path between the second network node and the first network node;
test using a diagnostic program the first communication path and the second communication path for network failures; and
send and receive data between the first network node and second network node using the alternate communication path when a network failure in the first communication path and the second communication path is detected, wherein the alternate communication path is a physical network.

17. The non-transitory computer readable medium of claim 16, wherein the instructions, when executed by the at least one processing device, further cause the at least one processing device to:
send diagnostic messages of the operational status of the second communication path to a first doubly attached node (DANP1) interface module connected to the first communication path and to a second doubly attached node (DANP2) interface module connected to the second communication path using the alternate communication path.

18. The non-transitory computer readable medium of claim 17, wherein the instructions, when executed by the at least one processing device, further cause the at least one processing device to:
halt the transmission and reception of data between the first network node and the first communication path and the second network node and the second communication path when diagnostic messages are received by each of the DANP1 and DANP2 interface modules of a failure of the first communication path and the second communication path; and
send and receive data between the first network node and the second network node using the alternate communication path.

19. The non-transitory computer readable medium of claim 18, wherein the instructions, when executed by the at least one processing device, further cause the at least one processing device to:
send an alert message to an operator station that the alternate communication path is being used to send and receive data between the first network node and the second network node and that a repair of the first and second communication paths is required.

20. The non-transitory computer readable medium of claim 19, wherein the instructions, when executed by the at least one processing device, further cause the at least one processing device to:
halt the transmission and reception of data through the alternate communication path and resume transmission and reception of data between the first network node and the second network node using the first and the second communication paths after the reception of a diagnostic message by each of the DANP1 and DANP2 interface modules that the first and second communication paths are operating normally.

* * * * *